(12) United States Patent
Lai

(10) Patent No.: US 9,140,340 B2
(45) Date of Patent: Sep. 22, 2015

(54) STEPLESS SPEED-CHANGE POWER TRANSMISSION FOR VEHICLE

(71) Applicant: Kwang Yang Motor Co., Ltd., Kaohsiung (TW)

(72) Inventor: Chien-Hung Lai, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 120 days.

(21) Appl. No.: 13/944,573

(22) Filed: Jul. 17, 2013

(65) Prior Publication Data

US 2014/0038756 A1  Feb. 6, 2014

(30) Foreign Application Priority Data

Jul. 31, 2012 (TW) .............................. 101127603 A

(51) Int. Cl.
| | | |
|---|---|---|
| F16H 57/04 | (2010.01) | |
| B62J 13/00 | (2006.01) | |
| F16D 1/00 | (2006.01) | |
| F16H 57/02 | (2012.01) | |
| F16H 9/12 | (2006.01) | |

(52) U.S. Cl.
CPC .............. *F16H 9/12* (2013.01); *F16H 57/0416* (2013.01); *F16H 57/0489* (2013.01); *F16H 2057/0203* (2013.01)

(58) Field of Classification Search
CPC ............ F16H 57/0489; F16H 57/0415; F16H 57/0416; F02B 61/02
USPC .................................................... 474/93, 144
See application file for complete search history.

(56) References Cited

U.S. PATENT DOCUMENTS

| | | | | |
|---|---|---|---|---|
| 1,334,511 | A * | 3/1920 | Williams ........................ | 474/93 |
| 1,434,770 | A * | 11/1922 | Bryson ........................ | 210/366 |
| 1,512,546 | A * | 10/1924 | Kimble ........................... | 474/93 |
| 2,145,545 | A * | 1/1939 | Johnson et al. ................ | 474/29 |
| 2,205,975 | A * | 6/1940 | Heyer ........................... | 474/29 |
| 2,215,831 | A * | 9/1940 | Heyer ........................... | 474/14 |
| 2,230,575 | A * | 2/1941 | Myers ............................ | 474/93 |
| 2,315,235 | A * | 3/1943 | Weidner et al. ................ | 416/60 |
| 2,315,317 | A * | 3/1943 | Copp et al. ..................... | 474/93 |
| 3,005,357 | A * | 10/1961 | Christian .................... | 74/421 A |
| 3,356,133 | A * | 12/1967 | Touze ............................ | 165/47 |
| 3,381,541 | A * | 5/1968 | Thireau et al. ................. | 474/93 |
| 3,467,177 | A * | 9/1969 | Hoddinott ....................... | 165/47 |
| 3,494,213 | A * | 2/1970 | Schoenfeld ..................... | 474/93 |
| 4,422,498 | A * | 12/1983 | Chen ............................. | 165/47 |
| 4,493,677 | A * | 1/1985 | Ikenoya .......................... | 474/93 |
| 4,596,537 | A * | 6/1986 | Te-Long ......................... | 474/93 |
| 4,631,977 | A * | 12/1986 | Kawashima ................ | 74/606 A |
| 4,671,781 | A * | 6/1987 | Tanaka et al. .................. | 474/93 |

(Continued)

*Primary Examiner* — Henry Liu

(74) *Attorney, Agent, or Firm* — Frommer Lawrence & Haug LLP

(57) ABSTRACT

A stepless speed-change power transmission for a vehicle includes a driving pulley disposed on an input shaft and including a fixed driving pulley half and a movable driving pulley half, a driven pulley disposed, on an output shaft and including a fixed driven pulley half and a movable driven pulley half, and an air guide unit. The air guide unit includes a curved first air guide wall and a curved second air guide wall that are disposed around the fixed driving pulley half to form first and second notches between the first and second air guide walls. The first notch guides air from the fixed driving pulley half onto the driven pulley. The second notch guides air from the fixed driving pulley half onto the movable driving pulley half.

8 Claims, 6 Drawing Sheets

(56) References Cited

U.S. PATENT DOCUMENTS

| | | | |
|---|---|---|---|
| 4,671,782 A * | 6/1987 | Ochiai et al. | 474/93 |
| 4,680,493 A * | 7/1987 | Ziegler et al. | 310/62 |
| 4,697,665 A * | 10/1987 | Eastman et al. | 180/230 |
| 4,708,699 A * | 11/1987 | Takano et al. | 474/144 |
| 5,156,069 A * | 10/1992 | Bitsch et al. | 74/606 R |
| 5,887,576 A * | 3/1999 | Wheeler et al. | 123/559.1 |
| 5,976,044 A * | 11/1999 | Kuyama | 474/93 |
| 6,267,700 B1 * | 7/2001 | Takayama | 474/93 |
| 6,938,508 B1 * | 9/2005 | Saagge | 474/93 |
| 7,059,438 B1 * | 6/2006 | Sheets | 180/68.1 |
| 7,363,999 B2 * | 4/2008 | Hastings | 180/220 |
| 7,427,248 B2 * | 9/2008 | Chonan | 474/93 |
| 7,686,123 B2 * | 3/2010 | Ishida | 180/346 |
| 7,798,930 B2 * | 9/2010 | Nojiri | 474/93 |
| 8,439,019 B1 * | 5/2013 | Carlson et al. | 123/559.1 |
| 8,439,020 B1 * | 5/2013 | Carlson et al. | 123/559.1 |
| 8,596,406 B2 * | 12/2013 | Itoo et al. | 180/339 |
| 2003/0183700 A1 * | 10/2003 | Kern et al. | 236/34 |
| 2004/0224806 A1 * | 11/2004 | Chonan | 474/93 |
| 2006/0270503 A1 * | 11/2006 | Suzuki et al. | 474/144 |
| 2009/0298627 A1 * | 12/2009 | Johnson et al. | 474/93 |
| 2013/0090198 A1 * | 4/2013 | Itoo et al. | 474/93 |
| 2013/0090199 A1 * | 4/2013 | Itoo et al. | 474/93 |
| 2013/0190114 A1 * | 7/2013 | Neumeister | 474/93 |

* cited by examiner

US 9,140,340 B2

STEPLESS SPEED-CHANGE POWER TRANSMISSION FOR VEHICLE

CROSS-REFERENCE TO RELATED APPLICATION

This application claims priority of Taiwanese Application No. 101127603, filed on Jul. 31, 2012.

BACKGROUND OF THE INVENTION

1. Field of the Invention

This invention relates to a speed-change power transmission, and more particularly to a stepless speed-change power transmission for a vehicle.

2. Description of the Related Art

Referring to FIGS. 1 and 2, a conventional speed-change power transmission disclosed in Taiwanese Invention Patent Publication No. I308613 includes a crankshaft box 12, a crankshaft 13 disposed in the crankshaft box 12, an outer cover 14 cooperating with the crankshaft box 12 to define an accommodating space 100 therebetween, a belt type speed-change system 15 disposed in the accommodating space 100 and driven by the crankshaft 13, and an air-guiding shield 16.

The crankshaft box 12 has an intake port 121 and an exhaust port 122 that, are in fluid communication with the accommodating space 100. The belt type speed-change system 15 includes a driving pulley 151, a driven pulley (not shown), and a transmission belt 154 trained on the driving pulley 151 and the driven pulley. The air-guiding shield 16 has a C-shaped flange 161 disposed around the driving pulley 151 and formed with an opening 162 that is opened toward the exhaust port 122. The driving pulley 151 includes a fixed pulley half 152 and a movable pulley half 153. The flange 161 is disposed around the fixed pulley half 152.

Due to the guiding action of the flange 161, air flows from the intake port 121 onto the fixed pulley half 152. Rotation of the fixed pulley half 152 results in flow of the air from the fixed pulley half 152 into the accommodating space 100 via the opening 162. Finally, the air is discharged through the exhaust port 122 to dissipate heat from the belt type speed-change system 15.

Since the flange 161 is formed with only one opening 162 that is opened toward the exhaust port 122, a majority of air is urged directly toward the exhaust port 122 by the fixed pulley half 152, and cannot impart a sufficient cooling effect to the movable pulley half 153.

SUMMARY OF THE INVENTION

The object of this invention is to provide a speed-change power transmission for a vehicle that can impart a sufficient cooling effect.

According to this invention, a stepless speed-change power transmission for a vehicle includes a driving pulley disposed on an input shaft and including a fixed driving pulley half and a movable driving pulley half, a driven pulley disposed on an output shaft and including a fixed driven pulley half and a movable driven pulley half, and an air guide unit. The air guide unit includes a curved first air guide wall and a curved second air guide wall that are disposed around the fixed driving pulley half to form first and second notches between the first and second air guide walls. The first notch guides air from the fixed driving pulley half onto the driven pulley. The second notch guides air from the fixed driving pulley half onto the movable driving pulley half.

Due to formation of the first and second notches between the first and second air guide walls, all of the fixed driving pulley half, the movable driving pulley half, the fixed driven pulley half, and the movable driven pulley half can be cooled effectively.

BRIEF DESCRIPTION OF THE DRAWINGS

These and other features and advantages of this invention will become apparent in the following detailed description of a preferred embodiments of this invention, with reference to the accompanying drawings, in which.

DETAILED DESCRIPTION OF THE PREFERRED EMBODIMENTS

Figure 1:
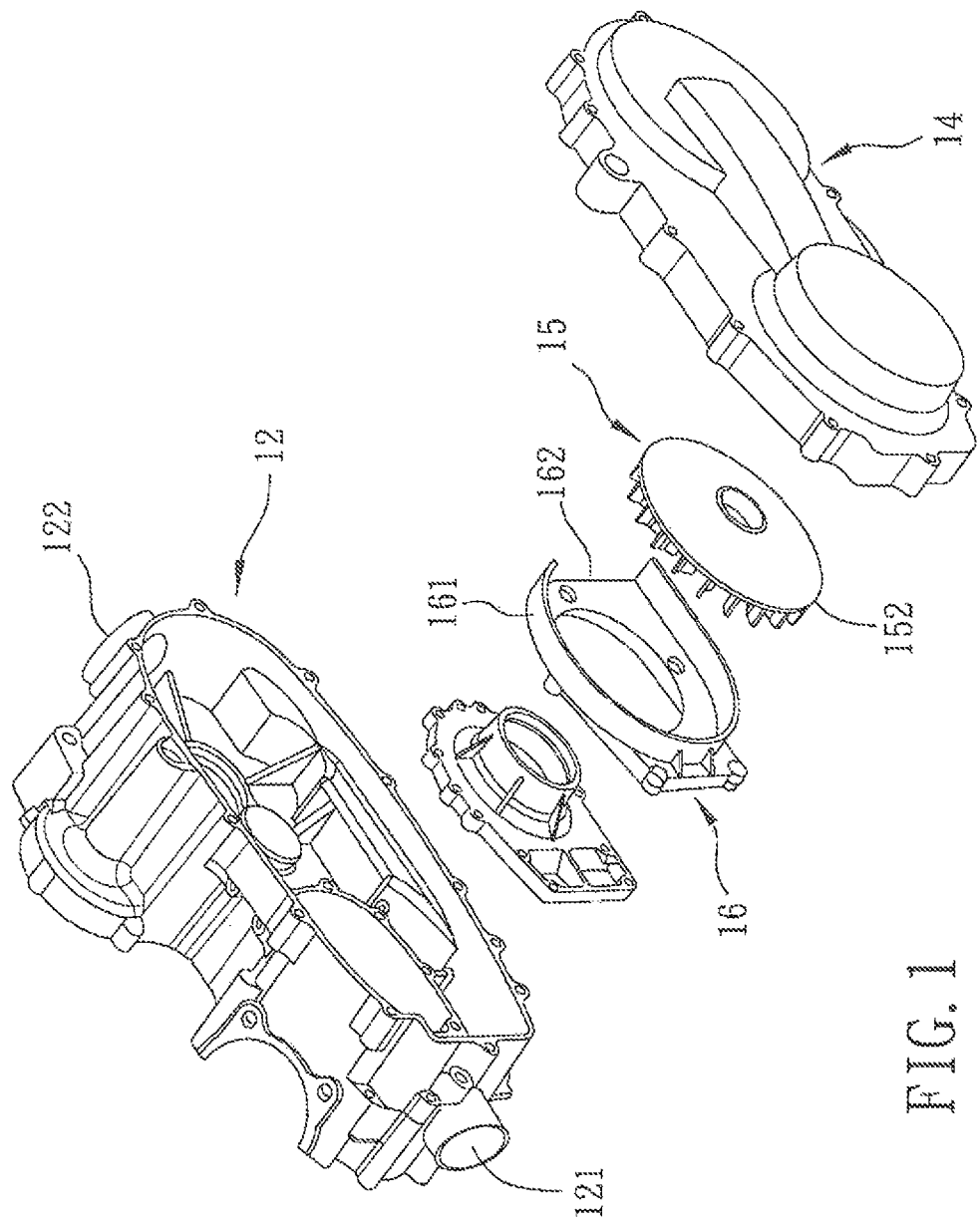
FIG. 1 is an exploded perspective view of a conventional speed-change power transmission disclosed in Taiwanese Invention Patent Publication No. I308613.
Figure 2:
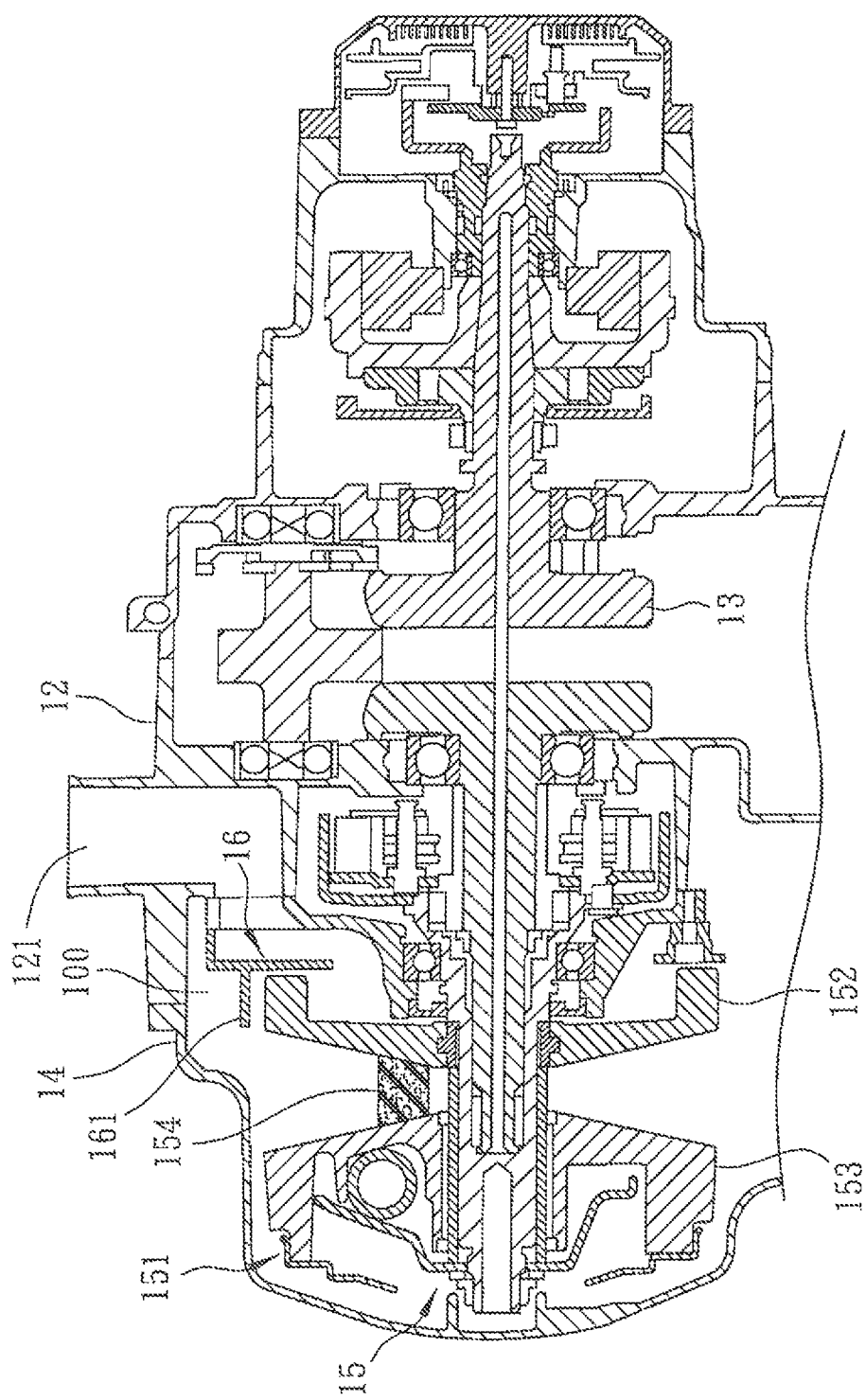
FIG. 2 is a sectional view of the conventional speed-change power transmission.

Before the present invention is described in greater detail in connection with the preferred embodiments, it should be noted that similar elements and structures are designated by like reference numerals throughout the entire disclosure.

Figure 3:
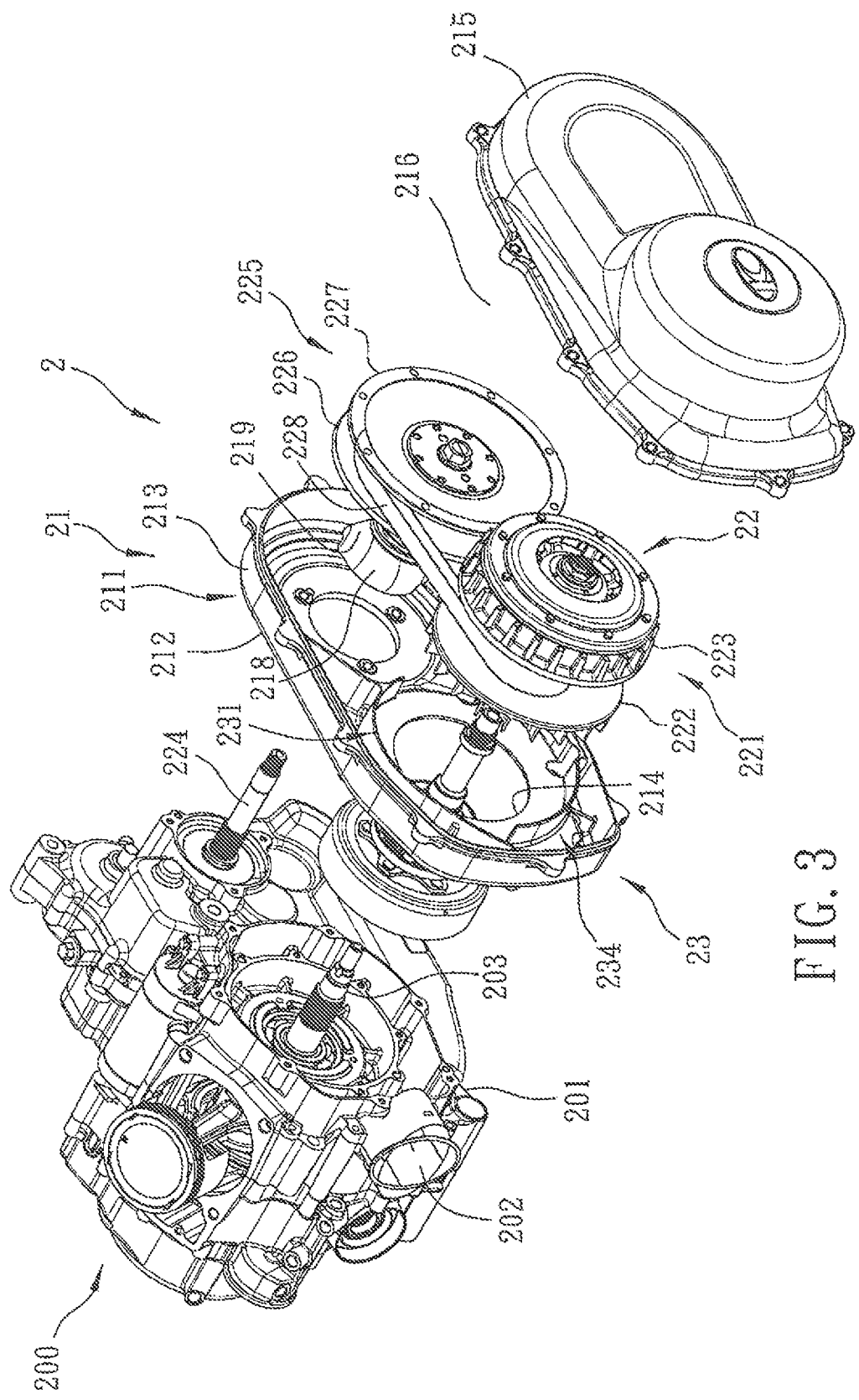
FIG. 3 is a partly exploded perspective view of the first preferred embodiment of a stepless speed-change power transmission for a vehicle according to this invention.
Figure 4:
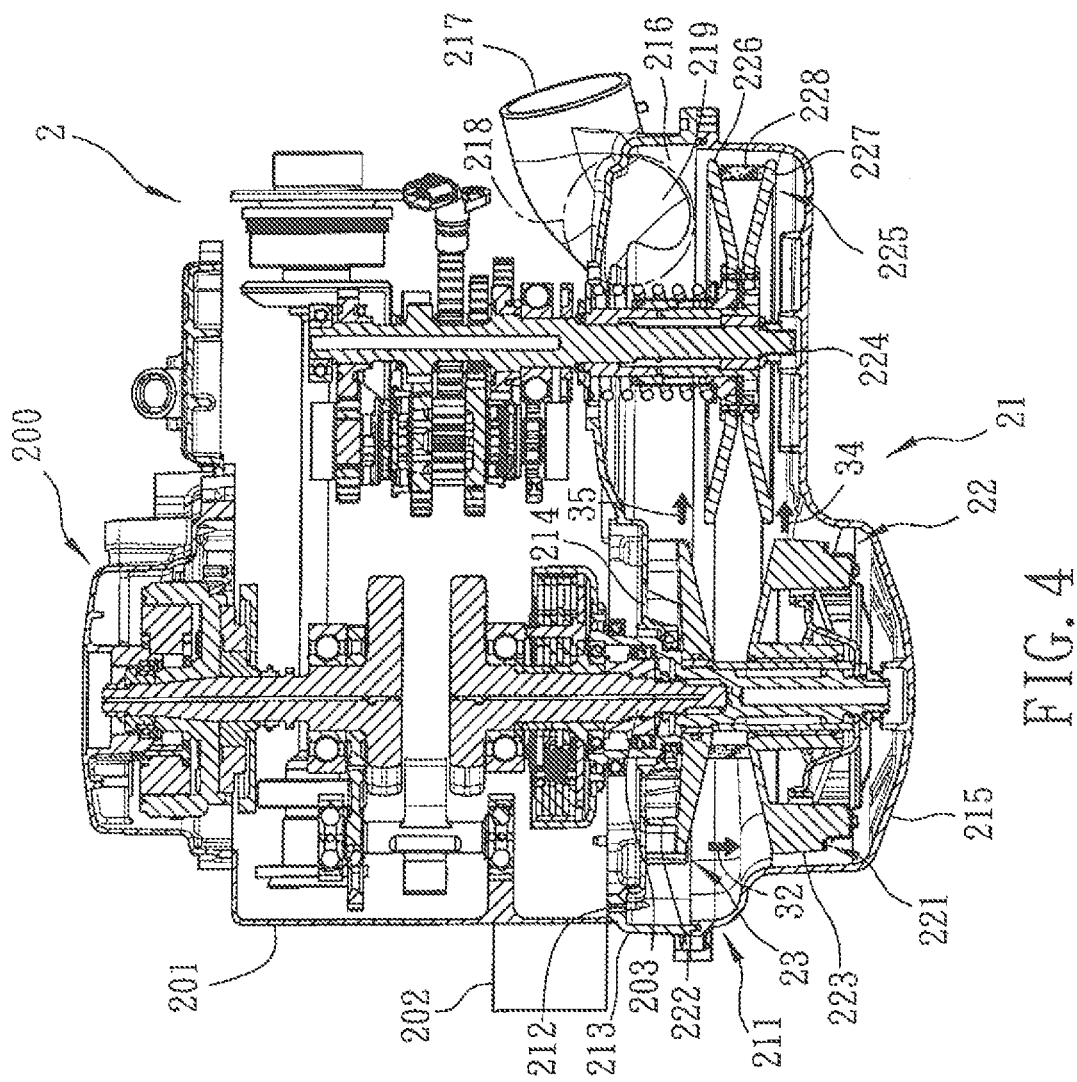
FIG. 4 is a sectional view of the first preferred embodiment.

Referring to FIGS. 3 and 4, the first preferred embodiment of a stepless speed-change power transmission according to this invention is usable with a vehicle engine 200. The engine 200 includes a crankshaft box 201 formed with an intake port 202 at a front end thereof, and an input shaft 203 extending from the crankshaft box 201.

The stepless speed-change power transmission 2 includes a transmission case 21 connected with the crankshaft box 201, a stepless speed-change unit 22 disposed in the transmission case 21, and an air guide unit 23 disposed in the transmission case 21 and aligned with the stepless speed-change unit 22.

The transmission case 21 includes a case body 211 connected to the crankshaft box 201, a cover 215 connected to the case body 211 to define an accommodating space 216 therebetween, and an exhaust, pipe 217 extending from the case body 211 and in fluid communication, with the accommodating space 216.

The case body 211 has a mounting wall 212 abutting against the crankshaft box 201, a surrounding wall 213 extending from a periphery of the mounting wall 212 toward the cover 215, and an opening 214 formed in the mounting wall 212 for fluid communication with the intake port 202 in the crankshaft box 201 and the accommodating space 216. The mounting wall 212 of the case body 211 has a hollow protrusion 218 extending from an outer surface of a rear end portion thereof in a direction away from the intake port 202 and formed with an outlet 219. In this embodiment, the exhaust pipe 217 extends from a wall of the hollow protrusion 218 defining the outlet 219.

The input shaft 203 extends into the accommodating space 216 through the opening 214. The exhaust pipe 217 extends from the case body 212 in a direction inclined relative to the input shaft 203, and has a rear end disposed behind and adjacent to the crankshaft box 201. This promotes space efficiency, and avoids an increase in the length and width of the engine 200.

In this embodiment, the case body 211 and the cover 215 of the transmission case 21 are formed from a plastic material by injection molding, and thus can be made easily. Furthermore, the weight of the transmission case 21 can be reduced significantly.

The stepless speed-change unit 22 includes a driving pulley 221 that is disposed on the input shaft 203, that is aligned with the opening 214, and that is disposed in the accommodating space 216, an output shaft 224 disposed pivotally on the mounting wall 212 of the transmission case 211 and behind the input shaft 203, a driven pulley 225 disposed on the output shaft 224 and in the accommodating space 216, and a transmission belt 228 trained on the driving pulley 221 and the driven pulley 225.

The driving pulley 221 includes a fixed driving pulley half 222 disposed fixedly on the input shaft 203, and a movable driving pulley half 223 disposed movably on the input shaft 203. The driven pulley 225 includes a movable driven pulley half 226 disposed movably on the output shaft 224, and a fixed driven pulley half 227 disposed fixedly on the output shaft 224. The transmission belt 228 is disposed between the fixed driving pulley half 222 and the movable driving pulley half 223, and between the movable driven pulley half 226 and the fixed driven pulley half 227.

Figure 5:
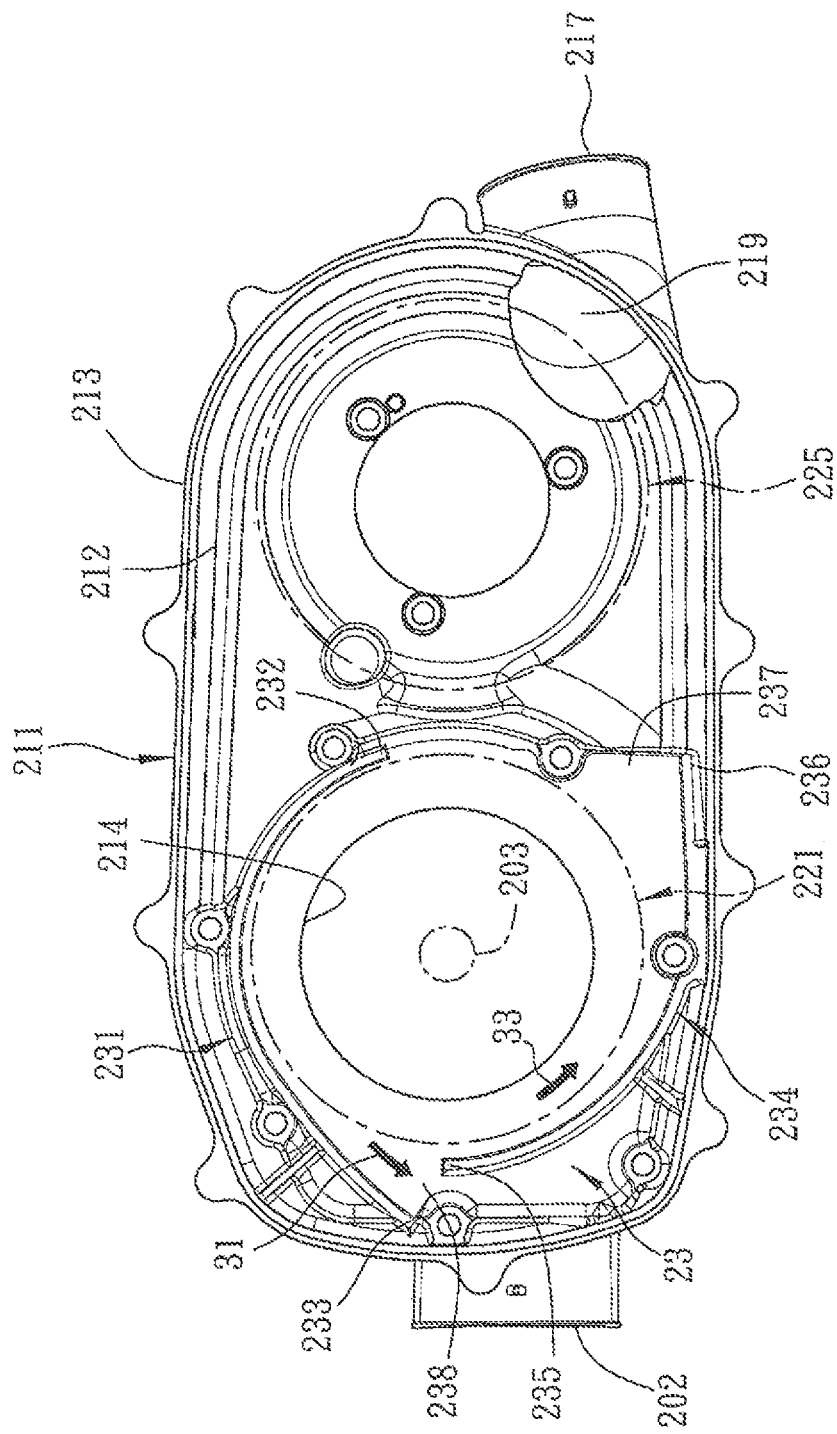
FIG. 5 is a schematic side view of the first preferred embodiment, illustrating a connection between a transmission case and an air guide unit.

With further reference to FIG. 5, the air guide unit 23 includes a curved first air guide wall 231 and a curved second air guide wall 234 that extend from the mounting wall 213 toward the cover 215. First and second notches 237, 238 are formed between the first and second air guide walls 231, 234. The first notch 237 is opened toward and adjacent to the driven pulley 225. The second notch 238 is adjacent to the movable driving pulley half 223. For convenience of illustration, the driving pulley 221, the driven pulley 225, and the input shaft 203 are shown in FIG. 5 by phantom lines.

Each of the first and second guide walls 231, 234 has a starting end 232, 235 and a terminal end 233, 236. The first and second air guide walls 231, 234 are disposed around the fixed driving pulley half 222. The distance between the starting end 232 of the first air guide wall 231 and the input shaft 203 is smaller than that between the terminal end 233 of the first air guide wall 231 and the input shaft 203. The distance between the starting end 235 of the second air guided wall 234 and the input shaft 203 is smaller than that between the terminal end 236 of the second air guide wall 234 and the input shaft 203. The first notch 237 is disposed between the starting end 232 of the first air guide wall 231 and the terminal end 236 of the second air guide wall 234. The second notch 238 is disposed between the starting end 235 of the second air guided wall 234 and the terminal end 233 of the first air guide wall 231.

When air flows from the intake port 202 into the accommodating space 216 through the opening 214, it advances along the first air guide wall 231, so that the fixed driving pulley half 222 is cooled.

When the air separates from the first air guide wall. 231, a portion thereof flows through the second notch 238 in a first direction 31 (see FIG. 5) and onto the movable driving pulley half 223 in a second direction 32 (see FIG. 4), while the remaining portion thereof flows along the second air guide wall 234 in a third direction 33 (see FIG. 5).

Flow of air on the movable driving pulley half 223 results in dissipation of heat from the movable driving pulley 223. Subsequently, air flows from the movable driving pulley half 223 onto the fixed driven pulley half 227 in a fourth direction 34 for cooling the fixed driven pulley half 227. When the air advances along the second air guide wall 234, it flows toward the movable driven pulley half 226 via the first notch 237 so as to cool the movable driven pulley half 226. Finally, all of the air exits through the outlet 219 and the exhaust pipe 217. Consequently, all of the fixed driving pulley half 222, the movable driving pulley half 223, the movable driven pulley half 226, the fixed driven pulley half 227, and the transmission belt 228 can be cooled effectively.

Figure 6:
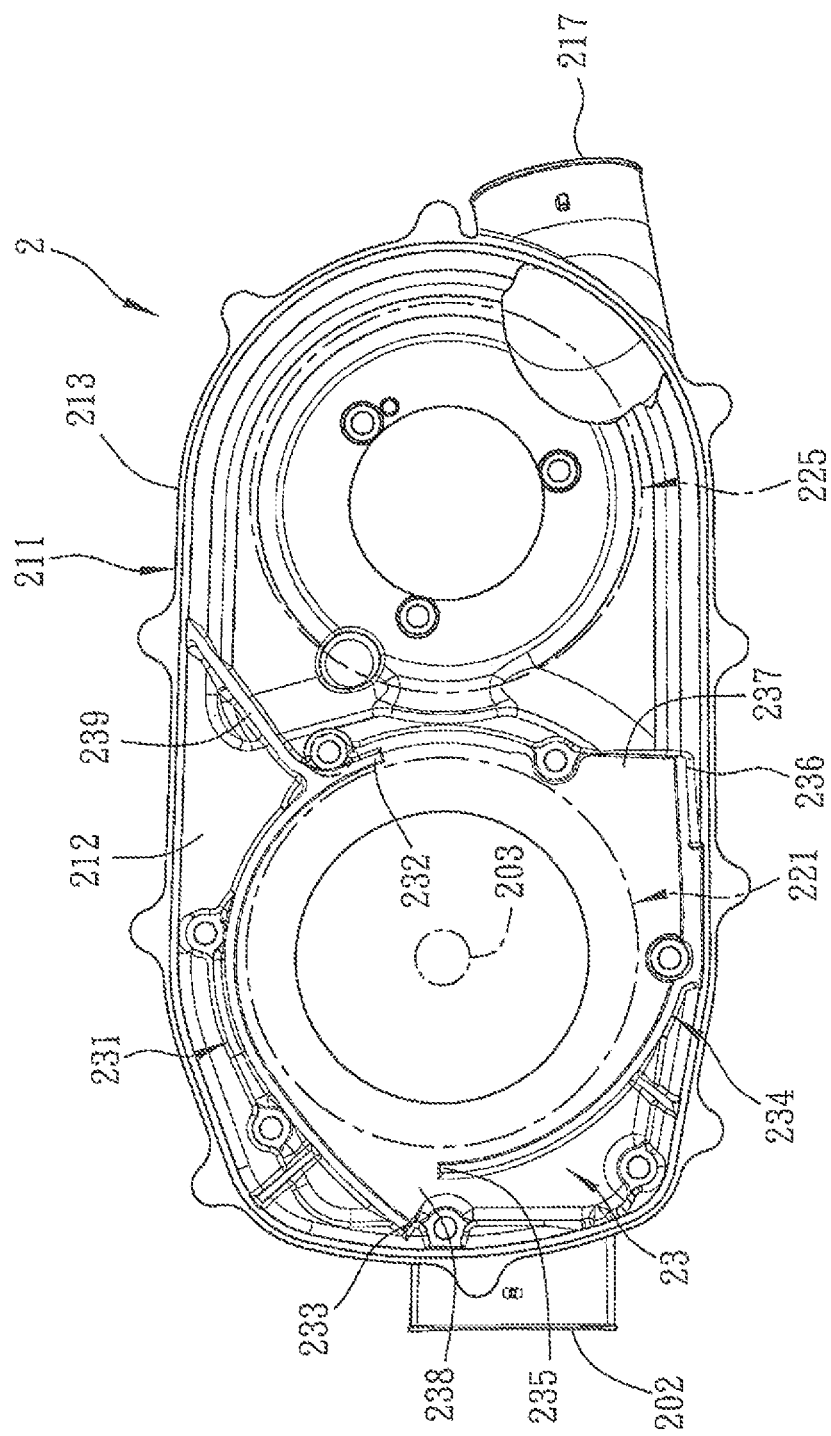
FIG. 6 is a side view of the second preferred embodiment of a stepless speed-change power transmission for a vehicle according to this invention.

FIG. 6 shows the second preferred embodiment of a stepless speed-change power transmission for a vehicle according to this invention, which differs from the first preferred embodiment in that, the air guide unit 23 further includes an air blocking plate 239 extending from the first air guide wall 231 in a direction away from the input shaft 203 and the second air guide wall 234 to connect with the surrounding wall 213 of the case body 211. Due to the presence of the air blocking wall 239, reverse flew of the air moving toward the exhaust pipe 217 can be prevented.

In view of the above, since the first and second notches 237, 238 are formed between the first and second air guide wails 231, 234, air can be guided to dissipate heat from the fixed driving pulley half 222, the movable driving pulley half 223, the movable driven pulley half 226, the fixed driven pulley half 227, and the transmission belt 228 through the outlet 219 and the exhaust pipe 217. Consequently, all of the fixed driving pulley half 222, the movable driving pulley half 223, the movable driven pulley half 226, the fixed driven pulley half 227, and the transmission belt 228 can be cooled effectively. Thus, the object of this invention is achieved.

With this invention thus explained, it is apparent chat numerous modifications and variations can be made without departing from the scope and spirit of this invention. It is therefore intended that this invention be limited only as indicated by the appended claims.

I claim:

1. A stepless speed-change power transmission adapted to be connected with a vehicle engine, the vehicle engine including a crankshaft box formed with an intake port at a front end thereof, and an input shaft extending from the crankshaft box, said stepless speed-change power transmission comprising:

a transmission case adapted to be connected with the crankshaft box and formed with an opening in fluid communication with said intake port in said transmission case, said input shaft extending into said transmission case through said opening;

a stepless speed-change unit including a driving pulley disposed on said input shaft and disposed in said transmission case, an output shaft disposed in said transmission case and adapted to be disposed behind said input shaft, a driven pulley disposed on said output shaft and in said transmission case, and a transmission belt trained on said driving pulley and said driven pulley, said driving pulley including a fixed driving pulley half and a movable driving pulley half, said driven pulley including a fixed driven pulley half and a movable driven pulley half, said transmission belt being disposed between said fixed driving pulley half and said movable driving pulley half, and between said fixed driven pulley half and said movable driven pulley half; and an air guide unit including a curved first air guide wall, and a curved second air guide wall which (a) are disposed in said transmission case, (b) each extend along a circumference of said fixed driving pulley half and (c) are spaced apart from each other around the circumference to define first and second notches therebetween, said first notch being positioned so as to guide air from said fixed driving pulley half onto said driven pulley, said second notch being positioned so as to guide air from said fixed driving pulley half onto said movable driving pulley half.

2. The stepless speed-change power transmission as claimed in claim 1, wherein each of said first and second air guide walls has a starting end and a terminal end, a distance between said starting end of said first air guide wall and said input shaft being smaller than that between said terminal end of said first air guide wall and said input shaft, a distance between said starting end of said second air guide wall and said input shaft being smaller than that between said terminal end of said second air guide wall and said input shaft, said first notch being adjacent to said driven pulley and being disposed between said starting end of said first air guide wall and said terminal end of said second air guide wall, said second notch being adjacent to said movable driving pulley half and being disposed between said starting end of said second air guide wall and said terminal end of said first air guide wall.

3. The stepless speed-change power transmission as claimed in claim 2, wherein said transmission case includes a case body adapted to be connected to said crankshaft box, a cover connected to said case body to define an accommodating space therebetween, and an exhaust pipe extending from said case body and in fluid communication with said accommodating space, said opening being formed in said case body and adapted for communicating said intake port in said crankshaft box fluidly with said accommodating space, said stepless speed-change unit and said air guide unit being disposed in said accommodating space.

4. The stepless speed-change power transmission as claimed in claim 3, wherein said exhaust pipe extends from said case body extends in a direction inclined relative to said input shaft.

5. The stepless speed-change power transmission as claimed in claim 3, wherein said case body has a mounting wall adapted to abut against the crankshaft box, and a surrounding wall extending from a periphery of said mounting wall toward said cover, said opening being formed in said mounting wall and being adapted for fluid communication with the intake port in the crankshaft box and said accommodating space, said first and second air guide walls extending from said mounting wall toward said cover, said exhaust pipe extending from said case body and having a rear end adapted to be disposed behind and adjacent to the crankshaft box.

6. The stepless speed-change power transmission as claimed in claim 5, wherein said air guide unit further includes an air blocking plate extending from said first air guide wall in a direction away from the input shaft and said second air guide wall to connect with said surrounding wall of said transmission case.

7. The stepless speed-change power transmission as claimed in claim 3, wherein said mounting wall of said case body has a hollow protrusion extending from an outer surface of a rear end portion thereof in a direction away from the intake port and formed with an outlet, said exhaust pipe extending from a wall of said hollow protrusion defining said outlet.

8. The stepless speed-change power transmission as claimed in claim 5, wherein said case body and said cover of said transmission case are formed from a plastic material by injection molding.

* * * * *